US006967734B1

(12) United States Patent
Wang et al.

(10) Patent No.: US 6,967,734 B1
(45) Date of Patent: Nov. 22, 2005

(54) SYSTEM FOR AUTOMATICALLY INSTALLING DIGITAL PRINTERS ON A NETWORK

(75) Inventors: Michael H. Wang, Macedon, NY (US); Steven T. Schlonski, Webster, NY (US); Krishna Kumar, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 1003 days.

(21) Appl. No.: 09/815,673

(22) Filed: Mar. 23, 2001

Related U.S. Application Data

(60) Provisional application No. 60/198,693, filed on Apr. 20, 2000.

(51) Int. Cl.[7] .............................................. G06F 15/00
(52) U.S. Cl. .................. 358/1.15; 358/1.13; 358/1.3; 709/222; 709/229; 710/10; 710/72
(58) Field of Search ................................. 358/1.3, 1.15, 358/1.13; 709/222, 229; 710/10, 72

(56) References Cited

U.S. PATENT DOCUMENTS

| 5,572,640 | A | | 11/1996 | Schettler ...................... 395/140 |
| 5,687,320 | A | | 11/1997 | Wiley et al. ............ 395/200.16 |
| 5,692,111 | A | * | 11/1997 | Marbry et al. ............. 358/1.15 |
| 5,832,191 | A | | 11/1998 | Thorne ........................ 395/114 |
| 6,184,998 | B1 | * | 2/2001 | Tebeka ....................... 358/1.15 |
| 6,301,012 | B1 | * | 10/2001 | White et al. ............... 358/1.15 |
| 6,789,111 | B1 | * | 9/2004 | Brockway et al. .......... 709/222 |

OTHER PUBLICATIONS

Microsoft Corporation, "Display and Print Devices: Windows Driver Development Kit", http://msdn.microsoft.com/library/default.asp?url=/library/en-us/graphics/hh/graphics.*

Microsoft Corporation, "Windows GDI: Windows Driver Development Kit", http://msdn.microsoft.com/library/default.asp?url=/library/en-us/graphics/hh/graphics/spoolfnc_e82f0e4d-e4f2-44b8-b957-3fc1b35e8a34.xml.asp.*

Microsoft Corporation, "Device Installation: Windows Driver Development Kit", http://msdn.microsoft.com/library/default.asp?url=/library/en-us/install/hh/install/install-over_c6753793-6321-4227-9e67-e7e8c4ae31cb.xml.asp.*

Microsoft Corporation, "Display and Print Devices: Windows Driver Development Kit", http://msdn.microsoft.com/library/default.asp?url=/library/en-us/graphics/hh/graphics/provider_7dc0bee7-51b1-4dab-9304-7b8bf27aee41.xml.asp.*

Microsoft Corporation, "Microsoft Windows 2000 Driver Development Kit", Mar. 2000, Microsoft Press, Edition No. 1, pp. 916-922 and 1097-1116.*

* cited by examiner

Primary Examiner—Edward Coles
Assistant Examiner—Mark R. Milia
(74) Attorney, Agent, or Firm—R. Hutter

(57) ABSTRACT

In the Microsoft® Windows 2000™ environment, ports for printers on a network can be created using an AddPort command and XcvData function. By placing pointers within XcvData to data structures, the process of adding ports can be made largely invisible to a user.

4 Claims, 2 Drawing Sheets

SYSTEM FOR AUTOMATICALLY INSTALLING DIGITAL PRINTERS ON A NETWORK

PRIORITY FROM PROVISIONAL APPLICATION

Priority for at least some aspects of the present application is claimed from U.S. Provisional Application 60/198,693, filed Apr. 20, 2000.

FIELD OF THE INVENTION

The present invention relates to a system for installing a set of digital printers (a term which may include digital copiers, facsimiles, and other office equipment) over a network. The invention is more specifically related to a "plug and print" arrangement particularly suitable for a Microsoft Windows 2000 environment.

BACKGROUND OF THE INVENTION

The concept of "network printing," in which a set of digital printers or other devices are controlled using a network protocol, is well known. Heretofore, management of a network of printers, particularly at installation, has been a labor-intensive process. In order to set up a plurality of printers and make the printers accessible to a plurality of computers, a server on the network has to be configured, and this configuration process typically involves having a systems administrator, that is a person with the particular responsibility of maintaining the network, identify printers on the network, and configure ports and drivers in order to access each of these printers. It would be preferable to provide a system in which a user could automatically survey a network for any printers which happen to be installed thereon at a particular time, and automatically add ports and drivers to the network to serve the discovered printers, all in a single automatic operation.

The present invention is directed toward a method for facilitating such an automatic installation system in the Microsoft Windows 2000 environment, using Microsoft-provided APIs.

DESCRIPTION OF THE PRIOR ART

U.S. Pat. No. 5,572,640 discloses "discovery/layout" software which configures a general purpose computer system to act as a management station using the SNMP protocol. The software has a discovery mechanism and a layout mechanism which, in combination, permit the software to provide various submaps on demand to a display.

U.S. Pat. No. 5,687,320 discloses a system for allowing a selected type of network device or resource, such as printers, to be discovered on a subnetwork and on remote subnetworks on a network. A broadcast message is sent requesting a response from each host on the subnetwork with a file having a listing of the device. Upon receipt of responses, a "stifle" message is transmitted to the host, thereby allowing subsequent broadcast messages to generate responses from remaining hosts. The responding hosts are then queried in order to obtain address information of potential devices on the subnetwork.

U.S. Pat. No. 5,832,191 discloses a method for enabling a printer which is newly installed on a network to automatically communicate with client processors on the network. In the disclosed arrangement, each printer installed on the network constantly broadcasts printer identification data onto the network. Each printer on the network broadcasts information about a specific predefined format.

SUMMARY OF THE INVENTION

According to the present invention, there is provided a method of creating a printer port in a Windows™ 2000 environment, comprising the steps of using a XcvData function incidental to an AddPort command, and inserting into the XcvData function, in the location for a pInputData parameter, a pointer to a data structure.

DETAILED DESCRIPTION OF THE INVENTION

Figure 1:
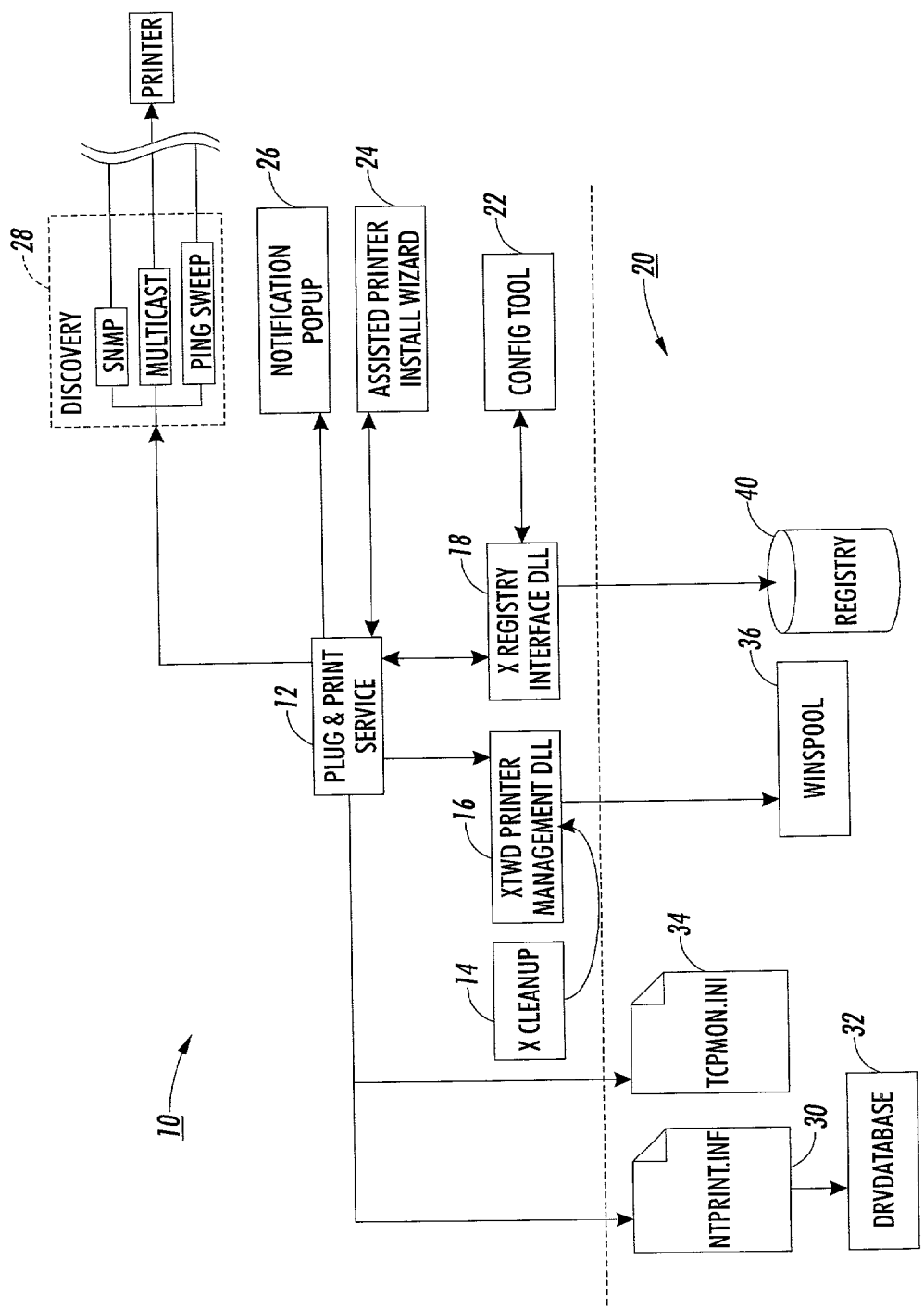
FIG. 1 is a diagram illustrating the basic elements of a print server, serving multiple printing devices, according to a preferred embodiment of the present invention.

FIG. 1 is a diagram showing the essential elements of a print server, to be used in the Microsoft Windows 2000 environment, according to a preferred embodiment of the present invention. The elements generally indicated as 10 above the central dotted line of FIG. 1 form parts of a print server, while the elements below the line, generally indicated as 20, are provided by the Windows 2000 environment. (MICROSOFT® and WINDOWS 2000™ are trademarks of Microsoft Corporation.)

Central to the print server of the present invention is what is here called a Plug and Print (PnP) Service, 12, the function of which will be described in detail below. There is further provided in the server according to the preferred embodiment of the present invention a clean up module 14, which has the function of cleaning out printer objects and ports which are not in use. The cleanup module 14 interacts with a printer management dynamically linked library, or DLL, indicated as 16. Module 18 is a registry DLL, which accesses a registry database, as will be explained below. Also provided is a configuration tool 22, which provides a graphical user interface environment, and also controls how often a particular network or subnetwork is surveyed for new printers. There is further provided an assisted printer install wizard 24, which has the function of allowing the user to install printers manually, should the automatic system of the present invention not be used. Also provided is notification pop-up system 26, which provides messages to the user as various installation events occurred, and a discovery module 28, which includes software for performing various printer discovery methods on a particular network or subnetwork. As such, the discovery module 28 preferably includes provisions for an SNMP based discovery method, multi cast discovery method, and/or a "ping sweep" discovery method. The basic principles of these various discovery methods are well known in the art.

The elements generally indicated as 20 are provided in the Microsoft Windows 2000 environment. The PnP Service 12 in the print server interfaces with two publicly available files provided by Windows 2000, one called TCPMON.INI, which is indicated as 34, and NTPRINT.INF, which is indicated as 30. TCPMON.INI is an ASCII file of printer descriptions of various makes and models of printers, in particular, the port and SNMP information for each model. This information is useful for configuring and controlling any particular printer which happens to be installed on a network. The file NTPRINT.INF is an equivalent file which relates to drivers, and as such can further refer to a driver database indicated as 32.

The printer management DLL 16 interacts with WIN-SPOOL 36 using the Microsoft Windows API. The registry interface 18 interacts with a Microsoft provided registry indicated as 40. The registry 40 is a data base in which a system object ID for a particular discovered printer can be looked up, so that the model name of the printer can be found.

The overall function of the method of the present invention is to enable a user at the server, such as a system administrator, to discover printers or equivalent devices which are connected (in a hardware sense) on a particular network or subnetwork, and use data gathered from these printers to enable automatic installation of these printers in the software sense. This software installation of a printer has basically three key steps: adding a port, adding the driver, and adding the printer. It is a key function of the present invention to enable all the three steps to be as automated as possible, and in fact be essentially invisible to the human user.

Before a particular printer can be installed in a software sense, printers which have been physically connected to the network must be "discovered" by the PnP server 12. The basic principle of discovering printers is known, and various basic principles of printer discovery are known as well, such as SNMP, multicast, and "ping sweep." These and any other discovery techniques can be applied to discover printers on a particular network. Following the discovery step, the PnP server 12 will have the system object ID for each available printer on the network. The system object ID is a special code indicating the make and model or type of printer (every manufacturer of printers is assigned a specific code, and then assigns another code to various models it manufactures). The server will also have for each printer a system description, which is a string variable which describes the type of printer in more human-readable terms (e.g., "Xerox Docu-Print N60 printer"), and the IP address of the printer, which is always provided in a response to a broadcast packet sent out in a discovery step.

Once a PnP server 12 obtains the system object I.D. for each printer connected on a particular network or subnetwork, the PnP Server 12 then applies the system object IDs to the registry interface 18, which in turn accesses the registry 40 which is available in the Windows 2000 environment. The system object I.D. for each printer is looked up in registry 40 and registry 40 returns the model name of a printer. If a particular system object I.D. is not available in registry 40, then that particular type of printer will not be supported. Following discovery of the model name in registry 40, the Internet address of the particular printer is added to the model name, to yield a printer name which is used as printer name to install the printer.

As mentioned above, the first step in the software installation of a printer is to "add the port," in a software sense, which is performed as follows. The "IP_" prefix is added to the IP address of the discovered printer to generate the Port name. The system description, which is a character string of the make and model of a particular printer discovered on the network, is applied to the TCPMON.INI file in the Windows 2000 environment. The file returns the necessary port details in response to a particular system description. If the file does not have port details for a particular system description, the port details specified manually by the user in the configuration tool 22 is used.

Figure 2:
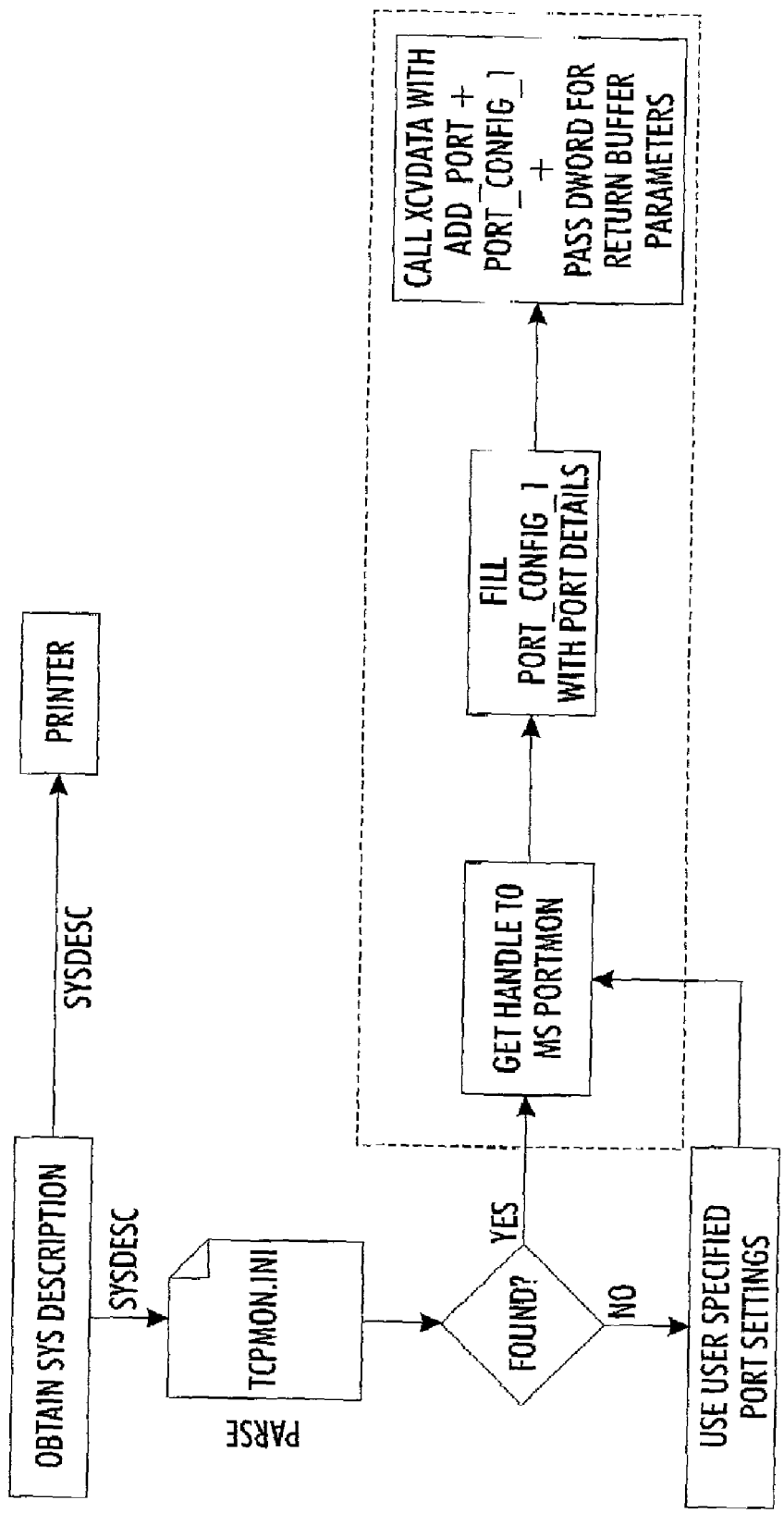
FIG. 2 is a flowchart describing a method of adding a port for a printer according to a preferred embodiment of the present invention.

With reference to the add-port functions shown in the flowchart of FIG. 2, the first step is to have the PnP Service 12 obtain the system description for a particular printer which is discovered on the network. Once again, this system description is applied to the TCPMON.INI file 34 and if the particular system description is found, the port details found in the file can be used to add the port. However, before that, access to Microsoft Standard Port Monitor must be enabled by calling the Microsoft API OpenPrinter( ). Once it is done, Microsoft Standard Port Monitor provides the XcvData function and a set of data structures to enable port creation. In this function is a data structure called PORT_DATA_1, and this data structure can be populated with the port details suitable for the discovered printer obtained from TCPMO-N.INI. "PORT_DATA_1" is filled up with the port details pertaining to the printer make model being installed. This command is used to add a Standard TCP/IP port.

The following description, in which the specific features of the claimed invention are discussed, is directed toward the part of the overall process located as the box marked "CALL XCVDATA WITH ADD_PORT+PORT_DATA_1" in FIG. 2. In other words, it is specifically directed toward adding a port, such as would be used by a printer on the network, as part of a larger process in which printers on a network are discovered and connected.

The XcvData function in the Windows 2000 environment requires various inputs apart from the "PORT_DATA_1" structure. One of the inputs as per the Microsoft documentation is pcbOutputNeeded, a double word memory location which is not required for the "AddPort" command. However, a key enabler of the automatic add-port functions of the present invention is that this parameter must be filled with a pointer to a double word location in memory. With particular reference to the present invention, the documentation associated with the XcvData API as of the filing hereof references a number of necessary parameters to facilitate the AddPort command, and two of these parameters are referenced in the documentation as "pinputData" and "pcbOutputNeeded." Quoting directly from the documentation, it is stated that pinputData is a "caller-supplied pointer to a buffer containing input data." Further in the documentation it is stated that "The pInputData parameter must point to a NULL-terminated port name string." Another required parameter, "pcbOutputNeeded," is a "Caller-supplied pointer to a location to receive the minimum size, in bytes, required for the buffer pointed to by pOutputData." The documentation then states that "The pOutputData, cbInputData, and pcbOutputNeeded parameters are not used."

According to various aspects of the present invention, in order to facilitate the AddPort command, certain steps must be taken in contrast to the teaching in the documentation issued by Microsoft as of the filing hereof. First, according to the present invention, the pInputData parameter should not point to a NULL-terminated port name string as described in the original documentation, but rather to the PORT_DATA_1 structure as described above. Further, the above statement about the parameters which are "not used" is, in the present invention, modified: XcvData needs a valid buffer (pointer to buffer) in pcbOutputNeeded. While the documentation implies that pOutputData, cbOutputData and pcbOutputNeeded can be NULL, when using XcvData according to the present invention, pcbOutputNeeded cannot be NULL.

Also in the original documentation, it is stated that "To communicate with a vendor-supplied port monitor, it might be necessary to send additional, customized data name strings before sending AddPort or DeletePort." However, with the present invention, a single call to XcvData( ) is sufficient.

As facilitated by the present invention, at least two key steps of the network set up process are automated to the point that, for each printer, these processes are invisible to the user. In the steps of adding a port to a discovered printer, the system description of the discovered printer is applied to the TCPMON.INI table supplied by it the Windows 2000 environment to obtain the port details for the particular make and model of printer. As facilitated by the present invention, this "parsing" step can be done in essentially a one-click operation largely invisible to the user. The port details which are thus automatically determined is used to add a new port to connect to the printer on the network. The combination of these two steps of finding the port details, and then applying the port details to the "AddPort" command, enables almost completely automatic (i.e., invisible to a human user) setting up of the port for a particular printer on a network. If the function is then run as described above, with "PORT_DATA_1" data structure as input, along with a valid location in memory for pcbOutputneeded, it will effectively cause an automatic setting up of the port to the printer, in accordance with the necessary port details for the particular make and model of a printer in question.

Another important modification to the basic AddPort command as described in the Microsoft documentation, which facilitates the present invention, is supplying a 0 to the parameter dwBufReq in XcvData( ).

Following the adding of the port, the next step in the process of installing a printer involves installing the necessary printer driver for the printer make and model. For adding the driver, the model name (as retrieved earlier from the registry 40 by applying the System Object ID for the discovered printer on the network) is applied by PnP Service 12 to the NTPRINT.INF file 30 in Windows 2000 to obtain a driver name. If a matching driver name does not appear in the NTPRINT.INF file 30, the driver must be manually specified by the user.

The final step involves creating a Printer Object and mapping the newly created port and driver on to it. This completes the automatic Printer Install. The user can start printing to the Printer using the Printer Object.

The following Appendix is a description of a code snippet which can be used to adapt the basic XcvData API to carry out the present invention. In the following description, lines of comment are preceded by "//".

```
//The code snippet makes use of Microsoft provided APIs/functions/methods
//     OpenPrinter( )
//     ClosePrinter( )
//     XcvData( )
//The input to this printer port LPR function is
//        pszPortName              : port name
//        pszPrinterAddr           : port ip address
//        pszLPRName               : lpr queue name
//        lDoubleSpool             : 1=enable/0=disable
//        lSNMPEnable,             : 1=enable/0=disable
//        lSNMPDeviceIndex         : snmp index value
//        pszSNMPCommName          : snmp community name
//The function returns TRUE/FALSE based on whether Add Port succeeded or /
// not.
BOOL PrnApi_AddPortLPR(TCHAR        *pszPortName,
                       TCHAR        *pszPrinterAddr,
                       TCHAR        *pszLPRName,
                       long         lDoubleSpool,
                       long         lSNMPEnable,
                       long         lSNMPDeviceIndex,
                       TCHAR        *pszSNMPCommName,
                       DWORD        &dwErrCode)
{
//Microsoft provided structure must be populated with port details
//before making the XCVData to AddPort Call
        PORT_DATA_1              PortInfo;
        BOOL                     bStatus = FALSE;
        HANDLE                   hXcv = INVALID_HANDLE_VALUE;
        DWORD                    dwStatus;
        PRINTER_DEFAULTS         Defaults = {NULL, NULL,
                                             SERVER_ACCESS_ADMINISTER}
//this the DWORD which must be supplied to XcvData( ) to make the AddPort
//succeed:
        DWORD                    dwBufReq = 0;
        TCHAR                    szMonitorName[_MAX_PATH];
        _stprintf(szMonitorName, XPNP_XCV_PORT_MONITOR_NAME);
//STEP #1
//Microsoft provides method OpenPrinter( ) . . .
//We need to get XCV handle before we can make the add port call
//The handle enables access to XCVData( )
bStatus = OpenPrinter(szMonitorName, &hXcv, &Defaults);
if (bStatus)
        {
//STEP #2
//fill in port information structure PORT_DATA_1
PortInfo.dwVersion = 1;
//Port data structure we are using . . . PORT_DATA_1, so 1
```

-continued

```
PortInfo.dwProtocol = PROTOCOL_LPR_TYPE;
//LPR port
PortInfo.dwPortNumber = 515;
//LPR port number
PortInfo.cbSize = sizeof(PortInfo);
//sizeof structure
PortInfo.dwReserved = 0;
//has to be zero, according to Microsoft documentation
PortInfo.dwDoubleSpool = IDoubleSpool;
PortInfo.dwSNMPEnabled = ISNMPEnable;
PortInfo.dwSNMPDevIndex = ISNMPDeviceIndex;
wcscpy(PortInfo.sztPortName, pszPortName);
//copy port name
wcscpy(PortInfo.sztHostAddress, pszPrinterAddr);
//copy host name or IP addr
wcscpy(PortInfo.sztIPAddress, pszPrinterAddr);
//copy IP addr
wcscpy(PortInfo.sztQueue, pszLPRName);
//copy LPR Queue
if (pszSNMPCommName)
            wcscpy(PortInfo.sztSNMPCommunity,
pszSNMPCommName);
//copy SNMP Comm name
//STEP #3
//XcvData( ) is Microsoft provided function to add port
//Following lines show the XcvData( )'s expected inputs/outputs
//XcvData(HANDLE hXcv,
//    LPCWSTR pszDataName,
//    PBYTE pInputData,
//    DWORD cbInputData,
//    PBYTE pOutputData,
//    DWORD cbOutputData,
//    PDWORD pcbOutputNeeded,
//    PDWORD pdwStatus);
//
//In the following lines we make the call, with actual values
        bStatus = XcvData(hXcv,
//hXcv, xcv handle from OpenPrinter( ) earlier
L"AddPort",
//pszDataName,
//Documentation says this must be "AddPort"
(PBYTE)&PortInfo,
//pInputData,
//Documentation says this must be Port Name, but in this case it is
//PORT_DATA_1
sizeof(PortInfo),
//cbInputData,
//size of info passed in pInputData
NULL,
//pOutputData,
//pointer to output data buffer, not required as per documentation, hence NULL
0,
//cbOutputData,
//output buffer size, not required as per documentation, hence NULL
&dwBufReq,
//pcbOutputNeeded, not required as per documentation, hence must be NULL,
//BUT IS REQUIRED to be a non NULL Valid value
//XcvData checks for this parameter
&dwStatus);
//pdwStatus , XcvData returns info about success/failure through this
//STEP #4
//By now XcvData( ) will have succeeded in adding the port or will have failed
//success/fail code is in bStatus
        ClosePrinter(hXcv);
```

What is claimed is:

1. A method of creating a printer port on a network in a Windows™ 2000 environment, comprising the steps of:
discovering a printer on the network;
using a XcvData function incidental to an AddPort command for adding a printer port for the printer;
inserting into the XcvData function, in the location for a pInputData parameter, a pointer to a data structure, the data structure including data useful in network port creation for the printer.

2. The method of claim 1, further comprising the step of inserting into the XcvData function, in the location for a pcbOutputNeeded parameter, a pointer to a buffer.

3. The method of claim 1, wherein the data structure is a PORT_DATA_1 structure incidental to the AddPort command.

4. The method of claim 1, further comprising the step of supplying dwBufReq=0 to the XcvData function.

* * * * *